(12) United States Patent
Smith

(10) Patent No.: US 6,877,624 B2
(45) Date of Patent: Apr. 12, 2005

(54) METHOD OF INJECTION MOLDING CLOSURE WITH CONTINUOUS INTERNAL RIGID RIB, CLOSURE MADE THEREBY HAVING A LEAD-IN STRUCTURE AND MOLD FOR FORMING SAME

(75) Inventor: Robert J. Smith, Edinboro, PA (US)

(73) Assignee: Erie County Plastics, Corry, PA (US)

( * ) Notice: Subject to any disclaimer, the term of this patent is extended or adjusted under 35 U.S.C. 154(b) by 0 days.

(21) Appl. No.: 09/683,751

(22) Filed: Feb. 11, 2002

(65) Prior Publication Data

US 2003/0121880 A1 Jul. 3, 2003

Related U.S. Application Data

(60) Provisional application No. 60/345,308, filed on Jan. 2, 2002.

(51) Int. Cl.⁷ .............................................. B65D 39/00
(52) U.S. Cl. ....................................... 215/252; 215/258
(58) Field of Search ............................... 215/250, 252, 215/251, 253–258, 216–218

(56) References Cited

U.S. PATENT DOCUMENTS

| | | | | |
|---|---|---|---|---|
| 2,153,427 A | * | 4/1939 | Fleisch et al. | 215/252 |
| 4,156,490 A | * | 5/1979 | Peraboni | 215/252 |
| 4,407,422 A | * | 10/1983 | Wilde et al. | 215/246 |
| 4,527,705 A | * | 7/1985 | Prades | 215/252 |
| 4,657,153 A | * | 4/1987 | Hayes | 215/252 |
| 4,658,976 A | * | 4/1987 | Pohlenz | 215/252 |
| 4,744,480 A | * | 5/1988 | Luch et al. | 215/252 |
| 4,971,212 A | * | 11/1990 | Kusz | 215/252 |
| 4,978,016 A | * | 12/1990 | Hayes | 215/252 |
| 4,981,230 A | * | 1/1991 | Marshall et al. | 215/252 |
| 5,007,545 A | * | 4/1991 | Imbery, Jr. | 215/14 |
| 5,090,788 A | * | 2/1992 | Ingram et al. | 215/252 |
| 5,271,512 A | * | 12/1993 | Ekkert | 215/252 |
| 5,648,037 A | * | 7/1997 | Franchet et al. | 264/296 |
| 5,715,959 A | * | 2/1998 | Pfefferkorn et al. | 215/252 |
| 5,727,705 A | * | 3/1998 | Kelly | 215/252 |
| 6,112,923 A | * | 9/2000 | Ma | 215/252 |
| 6,116,443 A | * | 9/2000 | Parrinello | 215/252 |
| 6,152,316 A | * | 11/2000 | Niese | 215/252 |
| 6,213,321 B1 | * | 4/2001 | Zumbuhl | 215/252 |
| 6,382,443 B1 | * | 5/2002 | Gregory | 215/252 |
| 6,399,170 B1 | * | 6/2002 | Hock et al. | 428/36.6 |

FOREIGN PATENT DOCUMENTS

| | | | | |
|---|---|---|---|---|
| DE | 4214151 | * | 11/1993 | 215/252 |
| EP | 641721 A1 | * | 8/1994 | 215/252 |
| EP | 799772 | * | 10/1997 | 215/252 |
| GB | 2033350 | * | 5/1980 | 215/252 |

* cited by examiner

Primary Examiner—Lien Ngo
(74) Attorney, Agent, or Firm—Blynn Shideler; Krisanne Shideler; BLK Law Group

(57) ABSTRACT

An injection molded container closure with a continuous internal projection, in particular a rib having a length-to-width ratio of at least one and one-half, is formed with a mold cavity between a pair of mold halves. One mold half includes a core forming the interior of the closed annular structure of the container closure, wherein the core is separated into a movable core portion and a remaining core portion at a separating line defined at the internal rib for forming the same.

14 Claims, 2 Drawing Sheets

METHOD OF INJECTION MOLDING CLOSURE WITH CONTINUOUS INTERNAL RIGID RIB, CLOSURE MADE THEREBY HAVING A LEAD-IN STRUCTURE AND MOLD FOR FORMING SAME

CROSS REFERENCE TO RELATED APPLICATIONS

This application claims the benefit of U.S. Provisional Patent Application Ser. No. 60/345,308, filed Jan. 2, 2002 entitled Method of Injection Molding Closure with Continuous Internal Rigid Rib, Closure Made Thereby Having a Lead-In Structure and Mold for Forming Same, which is incorporated herein by reference.

BACKGROUND OF INVENTION

1. Field of the Invention

The present invention relates to a method of injection molding a closure with a continuous internal rigid rib, an injection molded container closure with an internal lead-in structure and a mold for forming the same.

2. Brief Description of the Prior Art

The prior art discloses a wide variety of threaded container closures with additional internal structures. One typical internal structure for a threaded container closure is the interference elements for a tamper-evident band. The interference elements are intended to engage the container after the container closure is attached to the container to prevent the tamper-evident band from subsequently being removed from the container. This interference results in the separation of the tamper-evident band from the container closure when the container closure is removed from the container after initial attachment. This separation is intended to evidence any subsequent opening of the container to provide the desired tamper evidence to the user. The interference elements must allow the container closure to be initially attached onto the container without separating the tamper-evident band from the container closure at that point while subsequently acting to prevent the removal of the tamper-evident band prompting separation from the container closure as discussed above.

The interference elements can take several different shapes. An upward extending (i.e., extending toward the closed end of the container closure) integral continuous barb can be considered as the most effective shape for an interference element, but this shape is relatively difficult to efficiently manufacture. One solution addressing the manufacturing problem is to form the barb as a downwardly extending member as molded, which is folded up following the molding process. This solution is found in U.S. Pat. Nos. 4,848,614; 5,090,788; 4,807,771; 4,546,892; 4,595,110; 5,725,115; 5,775,527; 5,913,437; 6,116,442; and 6,119,883. Another known shape for the interference element is a shallow bead since the shallow bead presents less problems in manufacturing, but is not optimal for providing the amount of interference needed. See U.S. Pat. Nos. 4,549,667; 4,526,282; and 4,878,589. Another shape for the interference element is to form the element as a series of spaced separate elements to avoid a continuous hoop structure. See U.S. Pat. Nos. 4,196,818; 5,487,481; 6,112,923; 6,089,390; 6,068,151; 5,992,661; 5,950,850; 5,547,092; 5,064,084; 4,828,127; 4,497,765; 4,511,054; 4,520,939; 4,674,643; 5,328,044; 6,213,321; and 5,050,753.

Within the meaning of this specification, there is a distinction between a continuous projection or barb formed as a rib and a continuous projection or barb formed as a bead. This distinction between a bead and a rib within the meaning of this specification relates to the relative shape of the respective structure. In a projection of generally rectangular cross-section, a rib is a structure having a length-to-width ratio of at least one and one-half. A bead will have a length-to-width ratio less than one and one-half. The length of a projection is measured along the direction in which the projection is extending away from the side wall of the container closure. In non-rectangular shapes, the width would be the average width of the projection. Another term requiring further clarification within this specification is continuous. A continuous projection is a projection extending about three hundred sixty degrees around the side wall of the container closure such that the projection maintains hoop-like characteristics. A continuous projection need not actually form a complete closed ring. It is the hoop like characteristics that are important. The hoop like characteristics raise the issues associated with removing the threaded container closure from the mold in an efficient and cost-effective manner.

There is a need in the prior art to form a threaded, closed end container closure with a continuous internal rib on the container side wall that can be efficiently manufactured. The internal rib could be effectively used as an interference element for a tamper-evident band. Other uses for such an internal continuous rib are also possible. It is the object of the present invention to overcome the drawbacks of the above-described prior art. It is a further object of the present invention to provide a container closure with an internal continuous rib for use as an interfering element for a tamper-evident band and which improves the initial attachment of the container closure onto the container.

SUMMARY OF INVENTION

The above objects are achieved with an injection molded container closure in the form of a threaded flat cap according to the present invention and a mold for forming the same. The flat cap has a top on one end of an annular side wall forming a closed annular structure. The top may include a downward extending annular sealing flange or plug seal. The side wall includes an internal thread and may have external knurling for improved gripping by the user. The cap further includes a tamper-evident portion on a lower portion of the side wall. The tamper-evident portion may be considered as attached to a lower end of the side wall. The tamper-evident portion includes a plurality of frangible leaders extending across a score line to a lower band. The lower band includes a continuous internal rib below the leaders.

The continuous rib includes an improvement to assist in the installation on the cap onto the container. Specifically, the continuous rib includes an angled portion for a portion of the circumference, preferably about ninety degrees of the circumference. The angled portion may include a rounded end and essentially forms a one-way lead-in helical thread or portion for placing the cap onto the container. The lead-in provided by the angled portion is angled in the same direction as the thread of the cap and may be at the same pitch as the thread. The cap of the present invention may also form the interference element with the lead-in structure as a continuous internal bead rather than a continuous rib as described.

The present invention also provides an injection mold for forming a mold part in the form of a closed annular structure having a continuous internal rib, such as the flat threaded cap. The mold includes a pair of mold halves defining a mold cavity with one of the mold halves including a core forming the interior of the closed annular structure. The core is separated into a movable core portion and a remaining core portion at a separating line defined at the internal continuous rib. The moveable core is moveable away from the remaining core during ejection of the mold part following the molding process wherein a space is formed for the rib to move, or flex, into during the ejection process by the movement of the moveable core.

The above mold operates by injecting resin into the mold cavity; opening the mold cavity; moving the moveable core and molded part away from the remaining core during ejection of the mold part following the injection molding to form a space beneath the rib of the molded part; and ejecting the molded part from the moveable core wherein the rib is moved into the space formed by the movement of the moveable core.

The mold with the moveable or floating core could also be utilized for forming a retaining barb or projection of a snap-on closure or an internal sealing flange for a closure. The concept is relatively simple and intended to give the mold designer/creator flexibility in part creation. Additionally, the present invention provides an internal continuous rib that may preferably have a length-to-width ratio of at least two. The continuous internal rib of the present invention may be preferably angled away from the closed end of the container closure. Further, the thickness of the rib may be preferably greater than the thickness of the side wall of the container closure. Further, the thickness of the container closure side wall below the rib may be formed greater than the thickness of the side wall above the rib to assist in the container closure removal from the mold.

These and other advantages of the present invention will be clarified in the description of the preferred embodiments taken together with the attached drawings in which like reference numerals represent like elements throughout.

DETAILED DESCRIPTION

Figure 1:
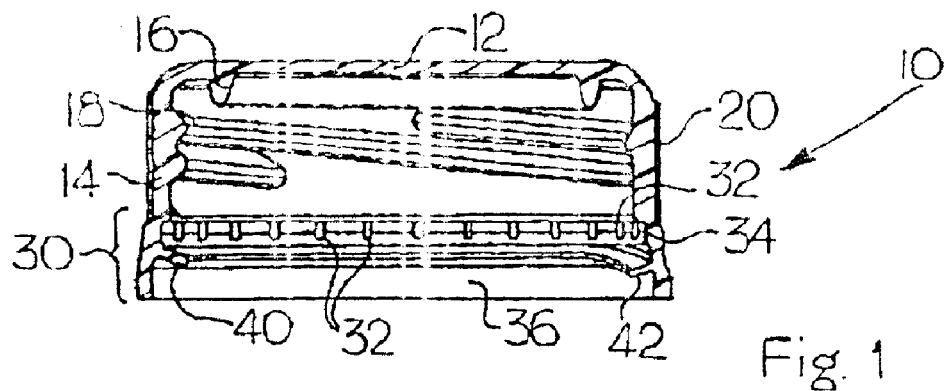
FIG. 1 is a sectional view of an injection molded flat cap having an internal continuous rib with a one-way lead-in according to the present invention.
Figure 2:
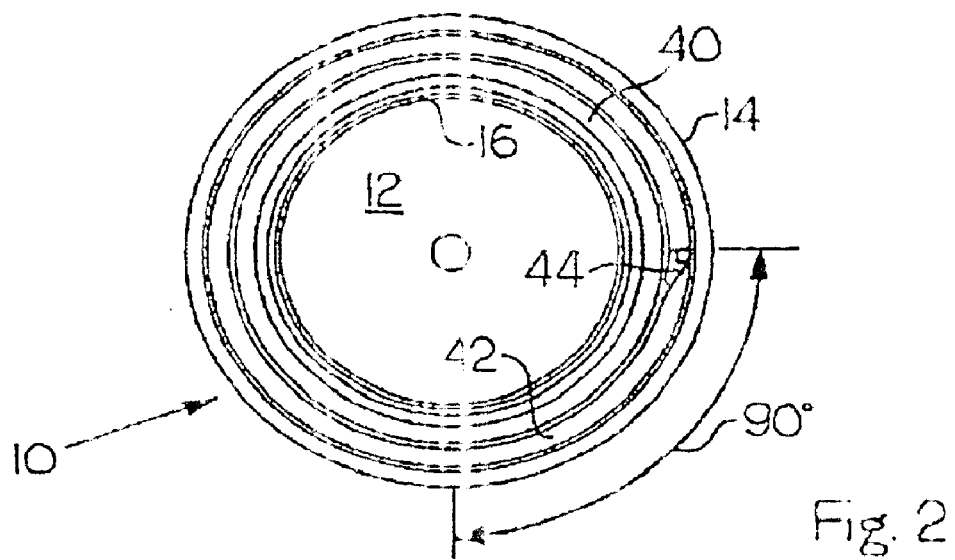
FIG. 2 is a bottom plan view of the cap shown in FIG. 1.
Figure 3:
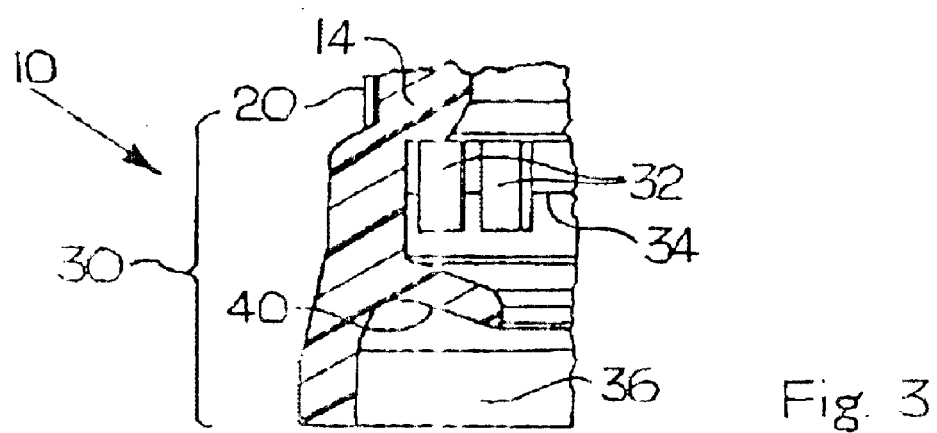
FIG. 3 is an enlarged sectional view of the continuous rib of the cap of FIG. 1.

One embodiment of the present invention is shown in FIGS. 1–3. As shown in FIGS. 1–3, the present invention is an injection molded, integral, one-piece container closure such as a flat cap 10 for a container (not shown). The cap 10 has a top 12 on one end of an annular side wall 14. The top 12 includes a downward extending annular sealing flange or plug seal 16. The side wall 14 includes an internal thread 18 and external knurling 20. The thread 18 will engage with threads of the container around a container opening with the sealing flange or plug seal 16 sealing the container opening in a conventional fashion. The knurling 20 on the exterior of the side wall 14 assist the user in gripping the cap 10.

The cap 10 includes a tamper-evident portion 30 on a lower portion of the side wall 14. The tamper-evident portion 30 includes a plurality of leaders 32 extending across a score line 34 to a lower band 36. The score line 34 is conventionally cut into the cap 10 following injection molding, however, it is possible to mold a groove or score line 34 in the injection molding process. The lower band 36 includes a continuous internal rib 40 below the leaders 32. The rib 40 engages a retaining ridge on the container to prevent the cap 10 from being removed from the container without detaching the tamper-evident band 36.

The rib 40 includes an improvement to assist in the installation on the cap 10 onto the container. Specifically, the rib 40 includes a tapered or angled portion 42 for about ninety degrees of the circumference, as shown in FIG. 2. The angled portion 42 includes a rounded end 44. The angled portion 42 essentially forms a thread for one quarter of the rib 40. This thread is intended to form a one-way lead-in helical thread for placing the cap 10 onto the container. Essentially, the thread or lead-in formed by the angled portion 42 and the end 44 allows the rib 40 of the cap 10 to be threaded past the retaining ridge on the container. Once in position past the retaining ridge of the container, the remaining portions of the continuous rib 40 will operate in a conventional fashion for tamper-evident bands on flat cap closures. Specifically, the rib 40 will engage the retaining ridge of the container and operate to hold the band 36 on the container when the cap 10 is removed from the container. The lead-in provided by the angled portion 42 is angled in the same direction as the thread 18 of the cap 10. The angled portion 42 may be at the same pitch as the thread 18, but this is not believed to be required. Due to the lead-in formed by the angled portion 42, a break is between the end 44 and the other end of the rib 40. Regardless, the rib 40 is still considered a continuous rib 40 within the meaning of this application since the rib 40 is continuous for substantially three hundred sixty degrees as shown in FIG. 2 and the rib 40 maintains hoop-like characteristics. The lead-in on the rib 40 will ease the installation of the cap 10 onto the container 10 as discussed above. This is believed to be an improvement over the prior art interference elements formed as continuous projections, specifically, continuous beads, in which the entire interference element is forced to jump over the ridge on the container. The present invention contemplates forming the cap 10 with a continuous bead in place of rib 40. The continuous bead would include the same lead-in features described above, providing the same advantages. The rib 40 provides the advantages of increased interference forces due to its relative shape. The manufacturing issues raised with the rib 40, rather than a shallower bead, are addressed below.

Figure 4:
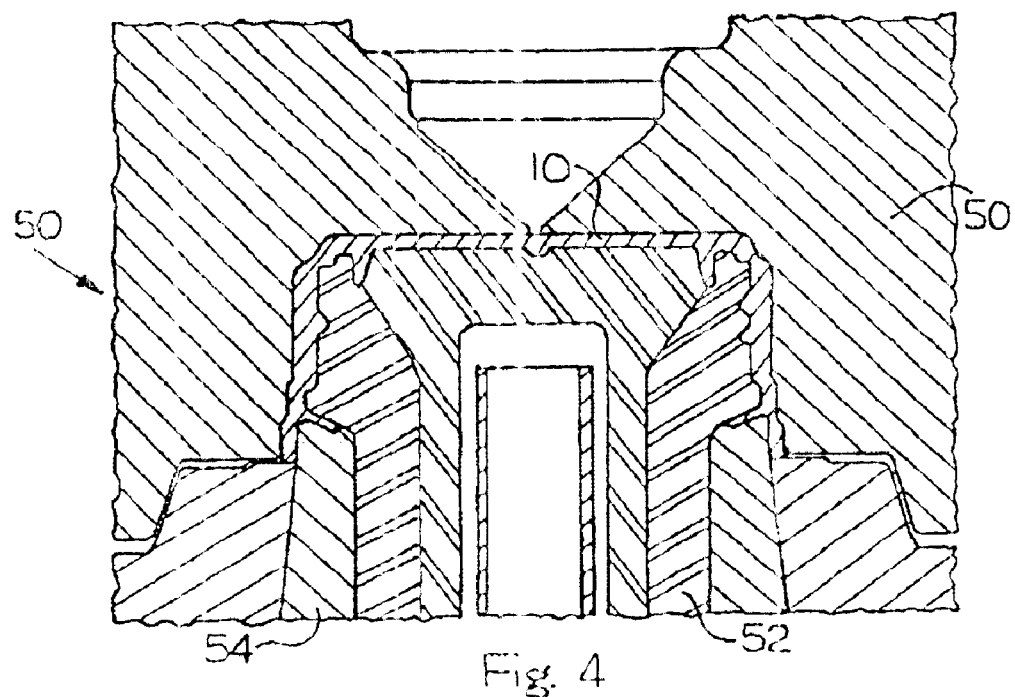
FIG. 4 is an enlarged sectional view of a portion of a mold for forming the injection molded cap with the internal rib shown in FIGS. 1–3.
Figure 5:
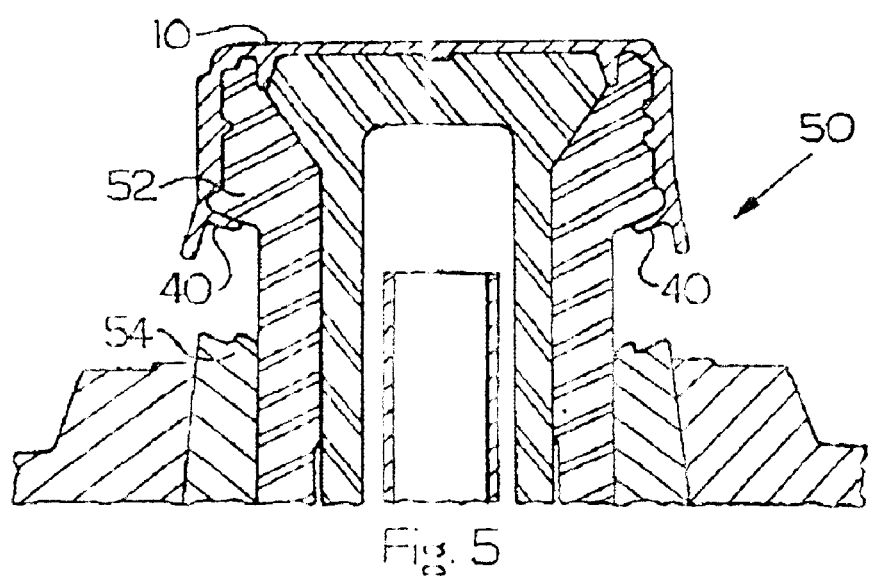
FIG. 5 an enlarged sectional view of the mold for forming the injection molded cap with the internal rib shown in FIGS. 1–3, with the mold in the release position.

The other aspect of the present invention is mold 50 for forming the cap 10, only the improvements of which are shown in FIGS. 4–5. In a conventional injection mold for flat caps, the mold cavity is divided into the two halves essentially forming the interior and exterior of the flat cap. After the cap is formed, the mold half forming the exterior is moved away leaving the newly formed cap on the mold half forming the interior of the cap. The flat cap is removed from the interior mold halve (also called the core) by unthreading the cap from the mold. The inclusion of tamper-evident portions on flat caps has raised a new issue since the engaging element, such as the rib 40 in the cap 10, must be accommodated in the removal of cap. The mold 50 provides a simple cost-effective structure for forming a continuos internal rib in a closed annular structure such as the rib 40 of the flat cap 10. The mold 50 includes a floating core portion 52 separated from the remaining core portion 54 at a separation line defined at the internal rib 40 to be formed.

The floating core portion 52 is designed to initially move with the cap 10 during the removal process forming a space beneath the internal rib 40 as shown in FIG. 5. The space formed by this initial axial movement of the floating core 52 will allow for the cap 10 to now be removed from the floating core in the conventional fashion by pusher rings (not shown) unthreading the cap 10 from the floating core 52. In this subsequent unthreading of the cap 10, the rib 40 can move, or flex, into the space formed by the movement of the floating core 52 away from the remaining core portion 54. The floating core 52 allows a more significant continuous rib 40 to be formed. The floating core 52 of the mold 50 is not limited to forming a retaining bead for a tamper-evident band, but can be effectively utilized for forming any internal continuous rib or flange in a closed annular configuration such as a one-piece closure. For example, the floating core concept could be utilized for forming a retaining rib of a snap-on closure or an internal sealing flange for a closure. The concept is relatively simple and intended to give the mold designer creator flexibility in part creation.

In addition to allowing the mold designer to easily form continuous internal rib structures, the present invention also addresses other associated design criteria for such ribs. For example, increasing a rib length will increase the difficulty in removing the associated closure from the mold but can improve the effectiveness of the rib as an interference element. The present invention provides an internal continuous rib that preferably has a length-to-width ratio of at least two. The continuous internal rib of the present invention is preferably angled away from the closed end of the container closure to assist in the flexing of the rib into the space created by the floating core. Increasing rib thickness, like length, increases the difficulty in removing the rib from the mold. Similarly, a review of the thickness of the side wall of the container closure indicates that an increase in thickness of the side wall of the container closure minimizes the ability of the structure to flex outwardly when removing the container closure from the mold. Following a review of these factors, the present invention contemplates that thickness of the rib may be preferably greater than the thickness of the side wall of the container closure, although this concept is illustrated in the cap 10 of the present invention. Further, the thickness of the container closure side wall below the rib may be formed greater than the thickness of the side wall above the rib to assist in the container closure removal from the mold. The present invention is believed to be the first to address the design concerns for an internal continuous rib in a closed container closure.

The invention has been described with reference to the preferred embodiment. Obvious modifications and alterations will occur to others upon reading and understanding the proceeding detailed description. It is intended that the invention be construed as including all such modifications and alterations insofar as they come within the scope of the appended claims or the equivalents thereof.

What is claimed is:

1. A container closure for a container comprising:
   a top positioned generally in a common top plane;
   an annular side wall extending from the top, the side wall having an internal thread positioned at a pitch angle relative to the common top plane and adapted to engage with threads of the container around a container opening; and
   a tamper-evident portion on a lower portion of the side wall, the tamper-evident portion including a plurality of leaders extending across a score line to a lower band, the lower band including a substantially continuous internal projection below the leaders, wherein the projection includes an angled portion for a portion of a circumference of the tamper-evident portion, the angled portion positioned at a pitch angle relative to the common top plane and forming a one-way lead-in helical thread for the projection, wherein the one-way lead-in thread formed by the angled portion has the pitch extending in a same direction as the internal thread of the annular side wall, whereby the one-way lead-in thread formed by the angled portion allows the projection of the tamper-evident portion to be threaded past a retaining ridge of a container.

2. The closure as claimed in claim 1 wherein the angled portion forming the one way lead-in thread extends for about ninety degrees of the circumference.

3. The closure as claimed in claim 2 further including a plug seal on the top, wherein the angled portion forming the one way lead-in thread includes a rounded end, and wherein the angled portion is angled with the same pitch angle as the threads on the side wall.

4. The closure as claimed in claim 1 wherein the projection is a rib having a length-to-width ratio of at least one and one-half.

5. The closure as claimed in claim 4 wherein the rib is substantially rectangular in cross-section, has a substantially uniform cross section around the circumference, and has a length-to-width ratio of at least two, and is angled away from the top.

6. A tamper-evident portion for a container closure wherein the tamper-evident portion is on a lower portion of the side wall of the container closure, the tamper-evident portion comprising:
   a lower band;
   a score line between the lower band and the side wall of the container closure, the score line defining a score line plane;
   a plurality of leaders extending across the score line between the lower band and the side wall of the container to connect the lower band to the side wall; and
   a substantially continuous internal projection on the lower band below the leaders, wherein the projection includes an angled portion for a portion of a circumference of the lower band, the angled portion positioned at a pitch angle relative to the score line plane and farming a one-way lead-in helical thread for the projection, whereby the one-way lead-in thread formed by the angled portion allows the projection of the tamper-evident portion to be threaded past a retaining ridge of a container.

7. The tamper-evident portion as claimed in claim 6 wherein the angled portion forming the one way lead-in thread extends for about ninety degrees of the circumference.

8. The tamper-evident portion as claimed in claim 6 wherein the projection is a rib having a length-to-width ratio of at least one and one-half and wherein the angled portion forming the one way lead-in thread includes a rounded end.

9. The tamper-evident band as claimed in claim 6 wherein the rib is substantially rectangular in cross-section, has a length-to-width ratio of at least two, has a substantially uniform cross section around the circumference, and is angled away from the leaders.

10. A one-piece injection molded container closure for a container comprising:

a top positioned generally in a common top plane;

an annular side wall extending from the top, the side wall having an internal thread having a pitch angled relative to the common top plane and adapted to engage with threads of the container around a container opening, the annular side wall having a distal edge positioned generally in a distal plane; and a tamper-evident portion on a lower portion of the side wall, the tamper-evident portion including a plurality of leaders extending across a score line to a lower band, the lower band including a substantially continuous internal rib below the leaders, wherein the substantially continuous internal rib extends inwardly and has a length-to-width ratio of at least one and one-half, wherein the rib extends extends inwardly from the lower band away from the top as molded and in use on a container wherein the rib includes an angled portion for a portion of a circumference of the lower band, the angled portion positioned at a pitch angle relative to the common top plane and forming a one-way lead-in helical thread for the rib, whereby the one-one way lead-in thread formed by the angled portion allows the rib of the tamper-evident portion to be thread past a retaining ridge of a container, and wherein substantially the entire length of the rib is positioned between the common top plane and the distal plane.

11. The container closure as claimed in claim 10 wherein the rib is substantially rectangular in cross-section and has a length-to-width ratio of at least two.

12. The container closure of claim 11, wherein the rib has a substantially constant cross section around a circumference of the lower band.

13. The container closure of claim 12 wherein the rib is designed to flex during exiting of the mold and forms a rigid interference element for the tamper evident portion following molding.

14. The container closure of claim 10 wherein a distal end of the rib is spaced from the side structure is positioned between the common top plane and the distal plane.

* * * * *